US012679099B2

(12) United States Patent
Hattori

(10) Patent No.: US 12,679,099 B2
(45) Date of Patent: Jul. 14, 2026

(54) PRINTING DEVICE

(71) Applicant: FUJIFILM Corporation, Tokyo (JP)

(72) Inventor: Kazumasa Hattori, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 145 days.

(21) Appl. No.: 18/736,501

(22) Filed: Jun. 6, 2024

(65) Prior Publication Data

US 2024/0316937 A1 Sep. 26, 2024

Related U.S. Application Data

(63) Continuation of application No. PCT/JP2022/039848, filed on Oct. 26, 2022.

(30) Foreign Application Priority Data

Dec. 15, 2021 (JP) ................................ 2021-203150

(51) Int. Cl.
*B41J 2/165* (2006.01)

(52) U.S. Cl.
CPC ........... *B41J 2/16552* (2013.01); *B41J 2/165* (2013.01); *B41J 2/16535* (2013.01); *B41J 2002/1655* (2013.01); *B41J 2002/16558* (2013.01)

(58) Field of Classification Search
CPC .... B41J 2/16552; B41J 2/165; B41J 2/16535; B41J 2002/1655; B41J 2002/16558; B41J 2/16538; B41J 2/16588
See application file for complete search history.

(56) References Cited

U.S. PATENT DOCUMENTS

| | | | |
|---|---|---|---|
| 10,618,290 | B2 | 4/2020 | Kitamura et al. |
| 2008/0278536 | A1 | 11/2008 | Ha et al. |
| 2010/0214357 | A1 | 8/2010 | Maida |

(Continued)

FOREIGN PATENT DOCUMENTS

| | | |
|---|---|---|
| JP | 2010221566 | 10/2010 |
| JP | 2014195934 | 10/2014 |

(Continued)

OTHER PUBLICATIONS

"International Search Report (Form PCT/ISA/210) of PCT/JP2022/039848," mailed on Dec. 13, 2022, with English translation thereof, pp. 1-5.

(Continued)

*Primary Examiner* — Justin Seo
(74) *Attorney, Agent, or Firm* — JCIPRNET

(57) ABSTRACT

Provided is a printing device that suppresses remaining of a mixture of an ink and a washing solution in a case of washing a print head. In a case where a length of a nozzle surface of a print head, which jets the ink from a plurality of nozzles disposed on a nozzle surface, in a first direction is defined as Lp, a length of a nozzle region of the nozzle surface, which has liquid repellency, in the first direction is defined as Ln, and a length of the washing solution holding surface of a washing solution holding member, which washes the nozzle surface facing the washing solution holding surface with the washing solution applied to the washing solution holding surface, in the first direction is defined as Lc, a relationship of Ln<Lc<Lp is satisfied.

9 Claims, 13 Drawing Sheets

(56) References Cited

U.S. PATENT DOCUMENTS

| | | | | |
|---|---|---|---|---|
| 2011/0234696 | A1* | 9/2011 | Inoue | B41J 2/16588 347/33 |
| 2012/0038707 | A1* | 2/2012 | Maida | B41J 2/16585 347/33 |
| 2014/0292911 | A1 | 10/2014 | Kajimoto et al. | |
| 2021/0221139 | A1 | 7/2021 | Hattori | |

FOREIGN PATENT DOCUMENTS

| | | |
|---|---|---|
| JP | 2019171797 | 10/2019 |
| JP | 6656929 | 3/2020 |
| WO | 2020095822 | 5/2020 |

OTHER PUBLICATIONS

"Written Opinion of the International Searching Authority (Form PCT/ISA/237) of PCT/JP2022/039848," mailed on Dec. 13, 2022, with English translation thereof, pp. 1-8.

"Search Report of Europe Counterpart Application", issued on Mar. 14, 2025, p. 1-p. 7.

* cited by examiner

PRINTING DEVICE

CROSS-REFERENCE TO RELATED APPLICATIONS

The present application is a Continuation of PCT International Application No. PCT/JP2022/039848 filed on Oct. 26, 2022 claiming priority under 35 U.S.C § 119(a) to Japanese Patent Application No. 2021-203150 filed on Dec. 15, 2021. Each of the above applications is hereby expressly incorporated by reference, in its entirety, into the present application.

BACKGROUND OF THE INVENTION

1. Field of the Invention

The present invention relates to a printing device and particularly to a technique of washing a nozzle surface of a print head.

2. Description of the Related Art

In a case where a nozzle surface of a print head becomes dirty due to a deteriorated ink, a nozzle with a jetting abnormality is generated in an ink jet recording device. In particular, in a case where a nozzle with a jetting abnormality is generated in a single-pass print head, streak unevenness is generated in a recorded image, and thus an image quality is significantly reduced. For this reason, in the ink jet recording device, maintenance of the print head, such as preliminary jetting, pressurizing purge, nozzle surface wiping, and nozzle suction, is performed in order to prevent generation of the jetting abnormality beforehand and to quickly correct the jetting abnormality.

For example, JP6656929B describes a maintenance device of a print head that is disposed near to form a liquid storage space with an upper surface of a base facing a nozzle surface of the print head and that supplies a liquid to the liquid storage space.

In addition, JP6142991B describes an ink jet recording device comprising a maintenance unit that washes a nozzle formed surface of a print head with a washing solution by bringing the nozzle formed surface and a liquid film of the washing solution, which is formed on a washing solution holding surface, into contact with each other.

SUMMARY OF THE INVENTION

However, in the device described in JP6656929B and the device described in JP6142991B, a mixture of an ink and a washing solution remains on an end part of the print head or the like in some cases. In a case where the remaining mixture sticks to the print head, there is a concern that replacement and adjustment of the print head become difficult.

In addition, as the nozzle surface of the print head is wiped such that the mixture is not stuck, there is a possibility that the nozzle surface of the print head is damaged in a case where an ink contains a relatively hard pigment.

Further, the mixture remains also on a washing device side where the print head is washed. In a case where the remaining mixture deposits on a washing device, the deposited mixture comes into contact with the nozzle surface of the print head. As a result, jettability of the print head is disturbed, and an image defect is generated in a printed article.

The present invention is devised in view of such circumstances, and an object thereof is to provide a printing device that suppresses remaining of a mixture of an ink and a washing solution in a case of washing a print head.

According to an aspect, in order to achieve the object, there is provided a printing device comprising a print head that jets an ink from a plurality of nozzles disposed on a nozzle surface, a washing solution holding member that has a washing solution holding surface, a relative moving mechanism that relatively moves the print head and the washing solution holding member and that causes the washing solution holding surface and the nozzle surface to face each other, and a washing solution applying mechanism that applies a washing solution to the washing solution holding surface and that washes the nozzle surface facing the washing solution holding surface, in which the nozzle surface has a nozzle region where the plurality of nozzles are disposed and that has liquid repellency and a non-nozzle region that has relatively lower liquid repellency than the liquid repellency of the nozzle region, and in a case where a length of the nozzle surface in a first direction is defined as Lp, a length of the nozzle region in the first direction is defined as Ln, and a length of the washing solution holding surface in the first direction is defined as Lc, a relationship of $Ln<Lc<Lp$ is satisfied. According to the present aspect, remaining of a mixture of the ink and the washing solution on the print head can be suppressed in a case of washing the print head.

It is preferable that the relative moving mechanism causes the entire washing solution holding surface in the first direction to face the nozzle surface and causes the entire nozzle region in the first direction to face the washing solution holding surface. Accordingly, remaining of the mixture on an end part of the print head can be suppressed.

It is preferable that the relative moving mechanism causes the washing solution holding surface and the nozzle surface to face each other in a state where the first direction is inclined with respect to a horizontal plane. Accordingly, the print head inclined with respect to the horizontal plane can be washed while being inclined.

It is preferable that the washing solution holding member has a side surface continuous to the washing solution holding surface, and an angle formed by the side surface on a downward side in a vertical direction and the washing solution holding surface is an acute angle. Accordingly, the mixture easily flows to the downward side of the side surface in the vertical direction, and remaining of the mixture on the washing solution holding member can be suppressed.

It is preferable that the side surface has liquid repellency. Accordingly, remaining of the mixture on the washing solution holding member can be suppressed.

It is preferable that the washing solution applying mechanism applies the washing solution to the washing solution holding surface from a downward side toward an upward side in a vertical direction. Accordingly, the flow speed of the washing solution can be made relatively slow, and the amount of the washing solution to be used can be relatively reduced.

It is preferable that the washing solution holding member has a washing solution supply port in the washing solution holding surface, and the washing solution applying mechanism causes the washing solution to be spurted from the washing solution supply port. Accordingly, the washing solution can be applied to the washing solution holding surface with a simple configuration.

It is preferable that the relative moving mechanism causes the washing solution supply port and the non-nozzle region to face each other. Accordingly, the washing solution can be spurted without affecting the ink in the nozzle, and the washing solution can be applied to the washing solution holding surface.

It is preferable that the relative moving mechanism relatively moves the print head in a second direction orthogonal to the first direction, the second direction being parallel to the washing solution holding surface, in a state where the washing solution holding surface and the nozzle surface face each other. Accordingly, even in a case where the length of the washing solution holding surface in the second direction is shorter than the length of the nozzle surface in the second direction, the entire nozzle surface can be washed.

It is preferable that a plurality of the print heads are arranged in the second direction. Even in a case where the plurality of print heads are arranged in the second direction, the entire nozzle surface can be washed.

It is preferable that a wiping device that wipes the washed nozzle surface with a wiping member is comprised. Accordingly, the washing solution remaining on the nozzle surface after washing can be removed.

With the present invention, remaining of the mixture of the ink and the washing solution can be suppressed in a case of washing the print head.

DESCRIPTION OF THE PREFERRED EMBODIMENTS

Hereinafter, a preferable embodiment of the present invention will be described in detail with reference to the accompanying drawings.

Configuration of Print Bar

Figure 1:
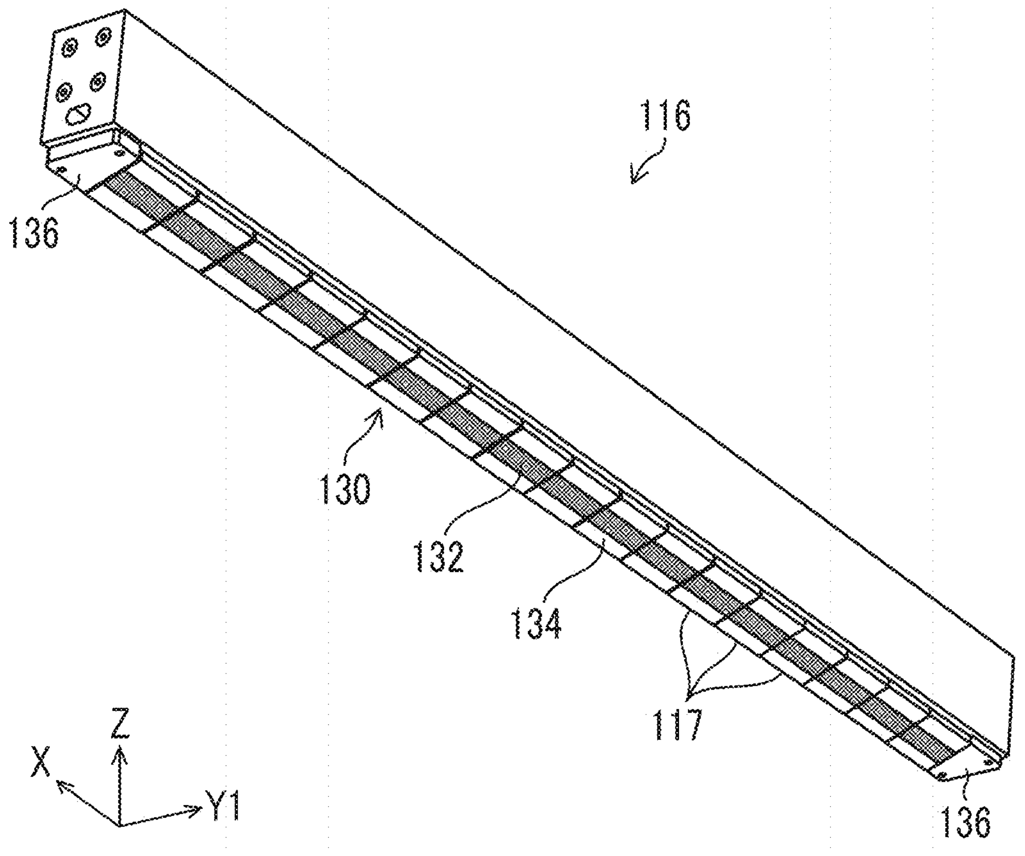
FIG. 1 is a perspective view of a print bar.

FIG. 1 is a perspective view of a print bar comprising a print head that is a washing target of a print head washing device. A print bar 116 is arrayed with 17 ink jet heads 117 (an example of the "print head") arranged in an X-direction (an example of a "second direction").

A nozzle surface 130 of the ink jet head 117 is composed of a nozzle plate 132, a wing portion 134, and an end cap portion 136. The nozzle plate 132 (an example of a "nozzle region") is subjected to liquid-repellent processing and has liquid repellency. In addition, the wing portion 134 (an example of a "non-nozzle region") and the end cap portion 136 have relatively lower liquid repellency than that of the nozzle plate 132.

Figure 2:
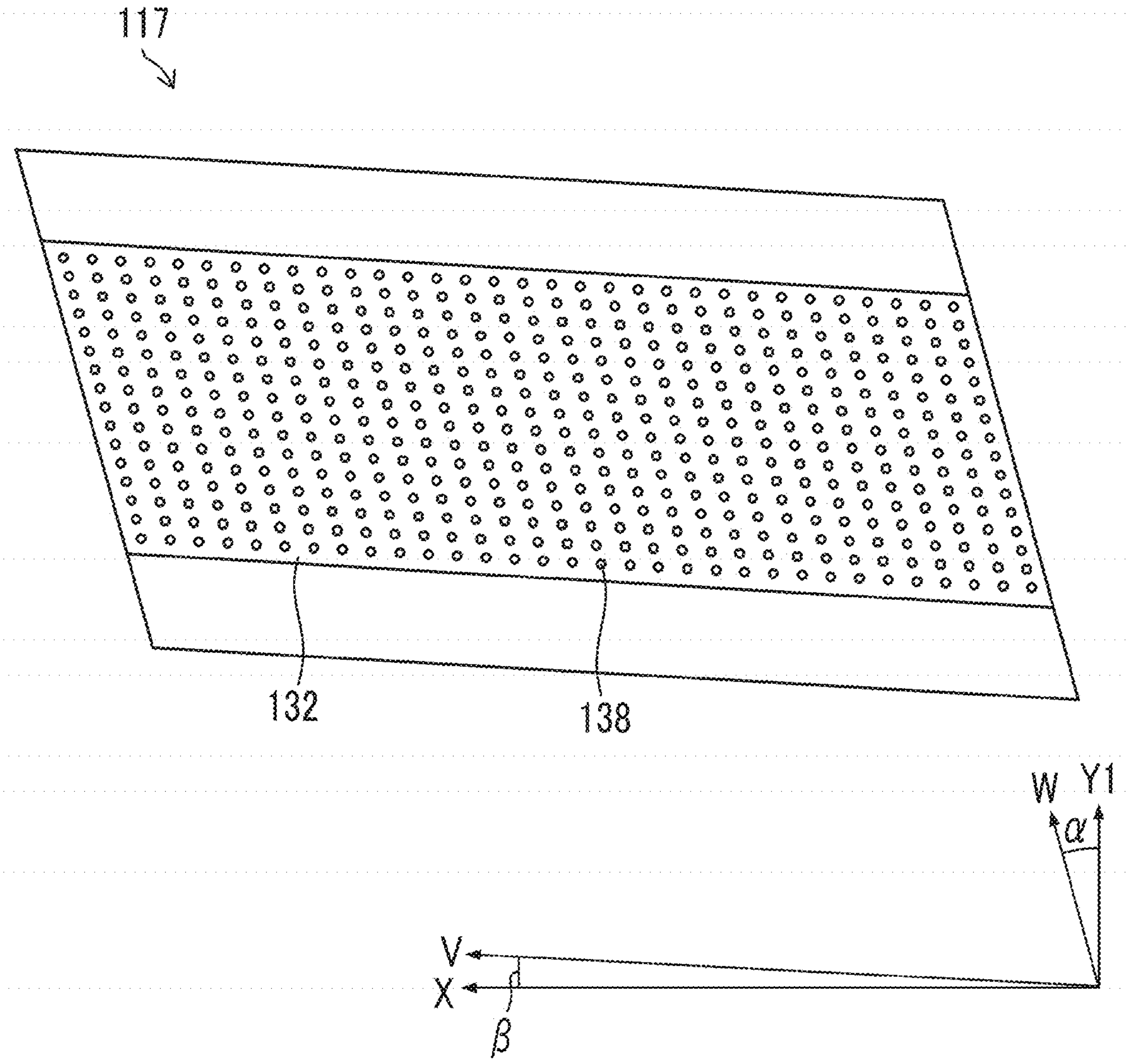
FIG. 2 is a plan view of a nozzle plate.

FIG. 2 is a plan view of the nozzle plate 132 of the nozzle surface 130 and shows one ink jet head 117. In the nozzle plate 132, a plurality of nozzles 138 are disposed in a V-direction having an inclination of an angle $\beta$ with respect to the X-direction parallel to a horizontal plane and a W-direction having an inclination of an angle $\alpha$ with respect to a Y1-direction orthogonal to the X-direction in a matrix. The Y1-direction is a Y-direction orthogonal to the X-direction and is a direction inclined by an angle $\gamma$ with respect to the Y-direction parallel to the horizontal plane with the X-direction as an axis.

The ink jet head 117 causes liquid droplets of an ink to be jetted from the nozzles 138 in a so-called piezoelectric manner. Each of the nozzles 138 communicates with each of pressure chambers, and the liquid droplets of the ink are jetted from the nozzles 138 by vibrating a wall surface of the pressure chamber with a piezoelectric element. The ink may be, for example, an aqueous ink. The aqueous ink refers to an ink obtained by dissolving or dispersing a coloring material such as a dye and a pigment in water and a solvent soluble in water.

<Configuration of Print Head Washing Device>

Figure 3:
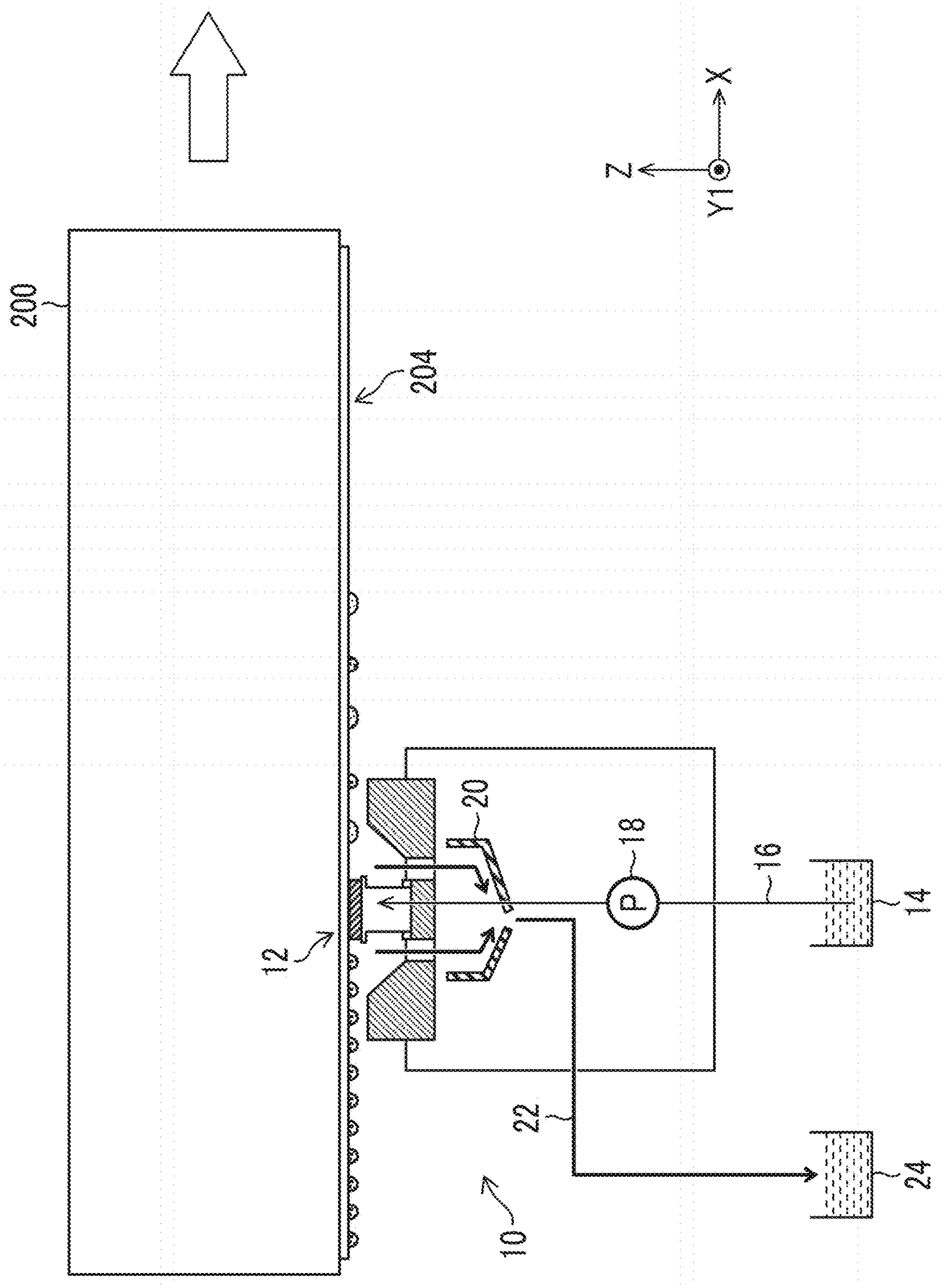
FIG. 3 is a schematic configuration view of a print head washing device.

FIG. 3 is a schematic configuration view of a print head washing device 10 that washes the print head and shows a state viewed from the Y1-direction. As shown in FIG. 3, the print head washing device 10 comprises a washing solution applying head 12, a washing solution tank 14, a supply flow passage 16, a supply pump 18, a collection dish 20, a collection flow passage 22, and a collection tank 24. The washing solution applying head 12 is erected in a vertically upward direction (+Z-direction).

The washing solution tank 14 stores a washing solution for washing the nozzle surface 130 of the ink jet head 117. As a washing solution, for example, a washing solution containing diethylene monobutyl ether as a main component is used. By applying this type of washing solution to the nozzle surface 130, an ink-derived mixture stuck to the nozzle surface 130 dissolves and can be easily removed.

The washing solution tank 14 communicates with the washing solution applying head 12 via the supply flow passage 16. In addition, the supply pump 18 is provided at the supply flow passage 16. The supply pump 18 (an example of a "washing solution applying mechanism") supplies the washing solution stored in the washing solution tank 14 to the washing solution applying head 12.

The collection dish 20 is disposed in a vertically downward direction (−Z-direction) of the washing solution applying head 12. The collection dish 20 has a shape of which an upper portion is open. In addition, a bottom portion of the collection dish 20 has an inclination with respect to the horizontal plane, and a collection hole (not shown) is provided in a lower end part in an inclination direction. The collection hole communicates with the collection tank 24 via the collection flow passage 22.

Figure 13:
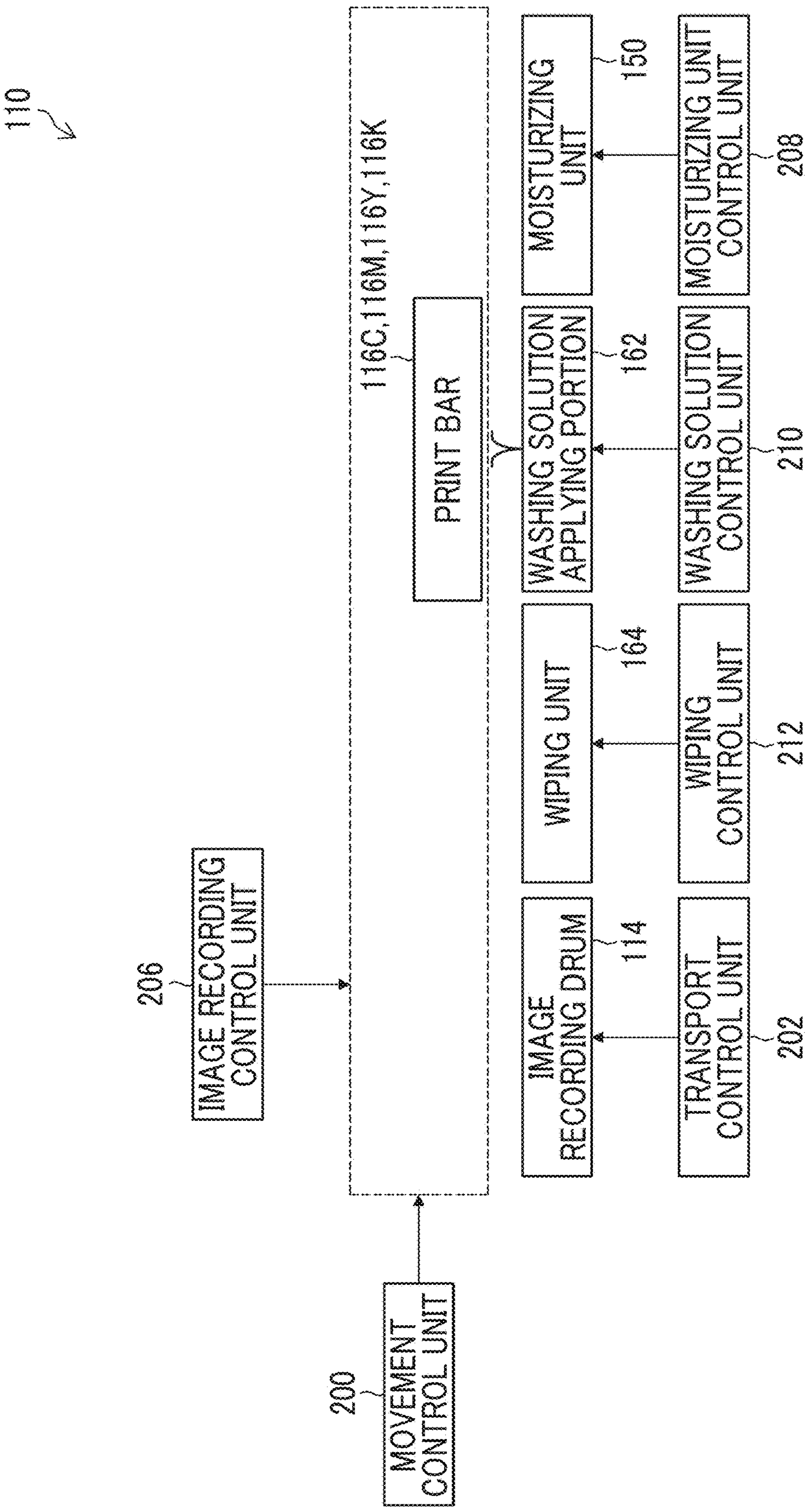
FIG. 13 is a block diagram showing an electric configuration of the image recording unit.

The print bar 116 is disposed at a position where the nozzle surface 130 of the ink jet head 117 faces the washing solution applying head 12 in parallel by a relative moving mechanism (for example, a transport control unit 202 shown in FIG. 13). The washing solution applying head 12 washes the nozzle surface 130 with a washing solution supplied from the washing solution tank 14. In the example shown in FIG. 3, as the print bar 116 is moved in the X-direction by the relative moving mechanism, the washing solution applying head 12 washes the nozzle surface 130 of each of the ink jet heads 117 in turn.

A washing solution that has washed the nozzle surface 130 is collected in the collection dish 20 together with an ink removed from the nozzle surface 130. A mixture of the washing solution and the ink which are collected in the collection dish 20 is collected in the collection tank 24 via the collection flow passage 22.

<Washing Solution Applying Head of Related Art>

Figure 4:
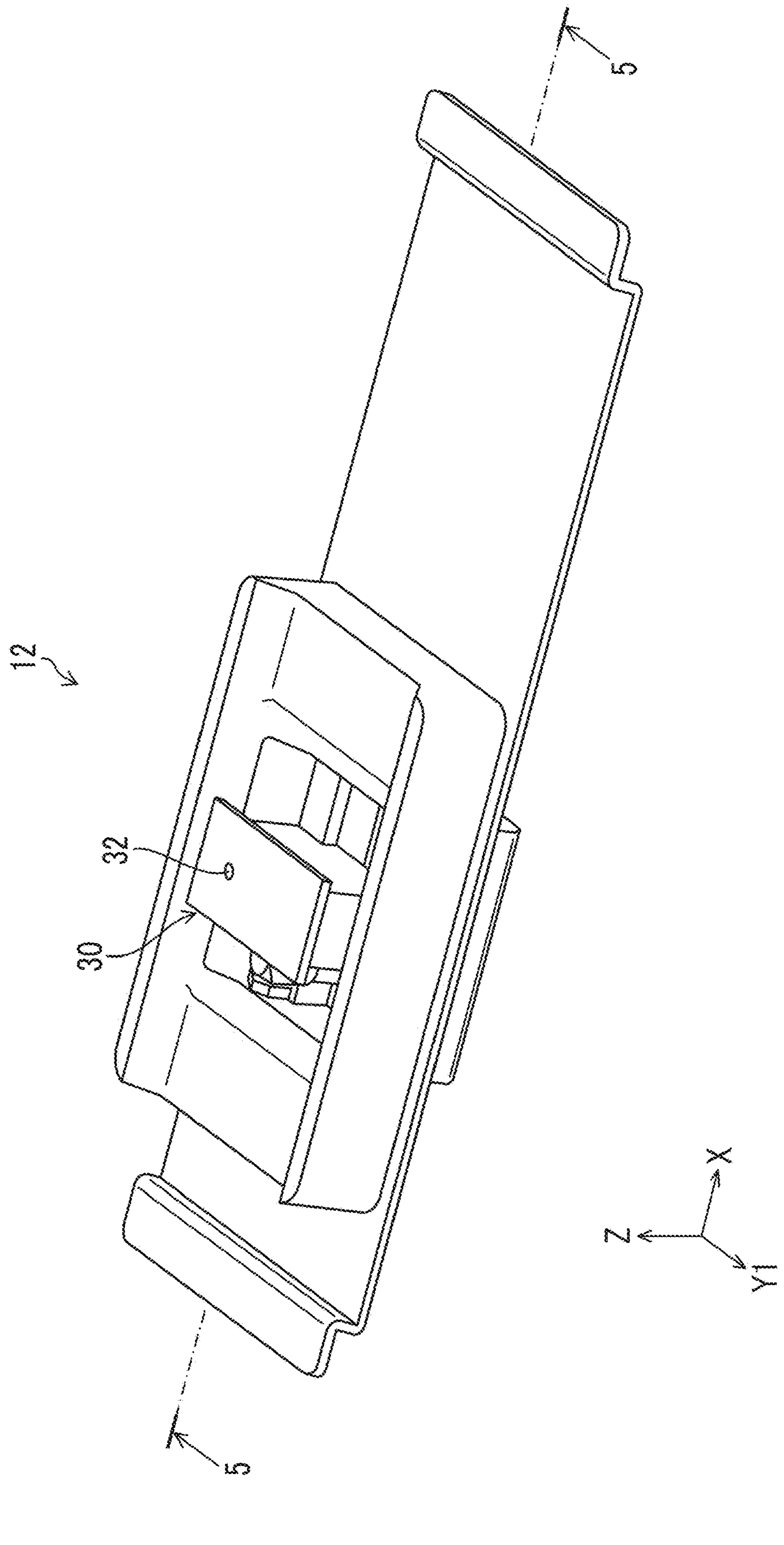
FIG. 4 is a perspective view of a washing solution applying head.
Figure 5:
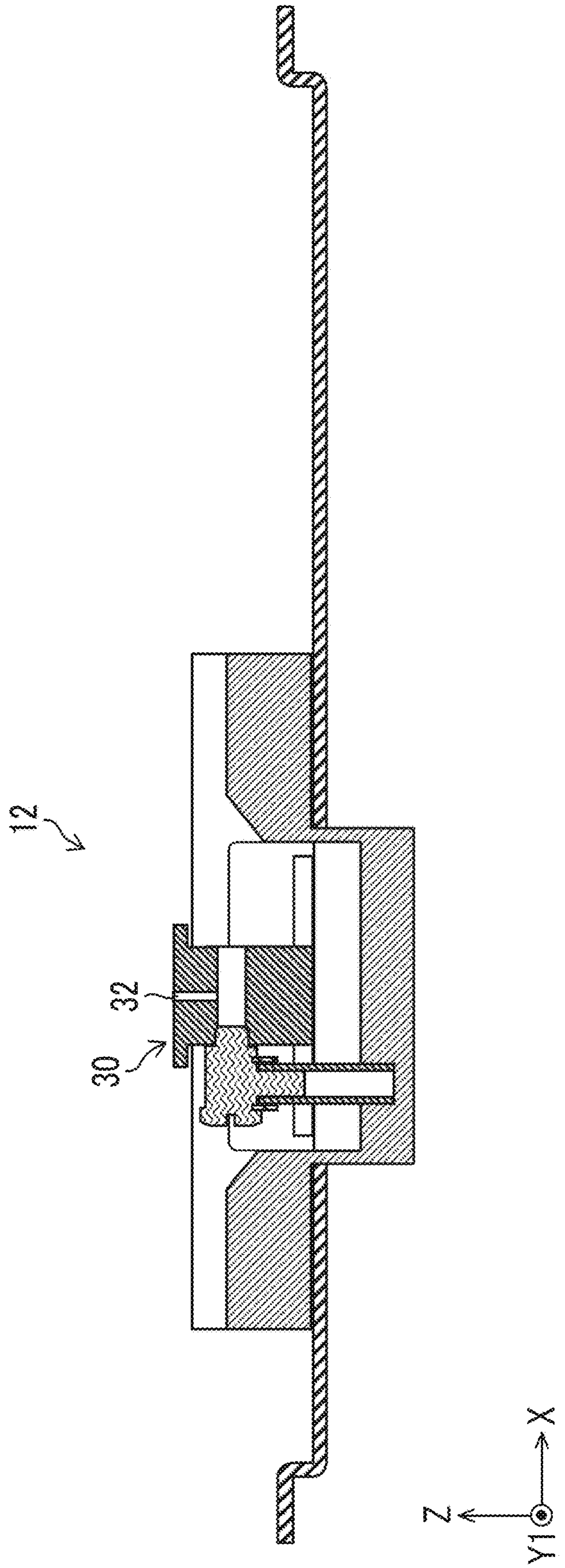
FIG. 5 is a cross sectional view taken along line 5-5 of FIG. 4.

FIG. 4 is a perspective view of the washing solution applying head 12. In addition, FIG. 5 is a cross sectional view taken along line 5-5 of FIG. 4. As shown in FIGS. 4 and 5, the washing solution applying head 12 (an example of a "washing solution holding member") comprises a washing solution holding surface 30 and a washing solution supply port 32. The washing solution holding surface 30 is a rectangular flat surface. The washing solution holding surface 30 is provided in parallel with an XY1-plane inclined by the angle $\gamma$ with respect to an XY-plane that is the horizontal plane with the X-direction as an axis. The washing solution supply port 32 (an example of the "washing solution applying mechanism") is a hole which is partially open in the washing solution holding surface 30. A washing solution supplied from the washing solution tank 14 is spurted from the washing solution supply port 32 and is supplied to the washing solution holding surface 30.

Figure 6:
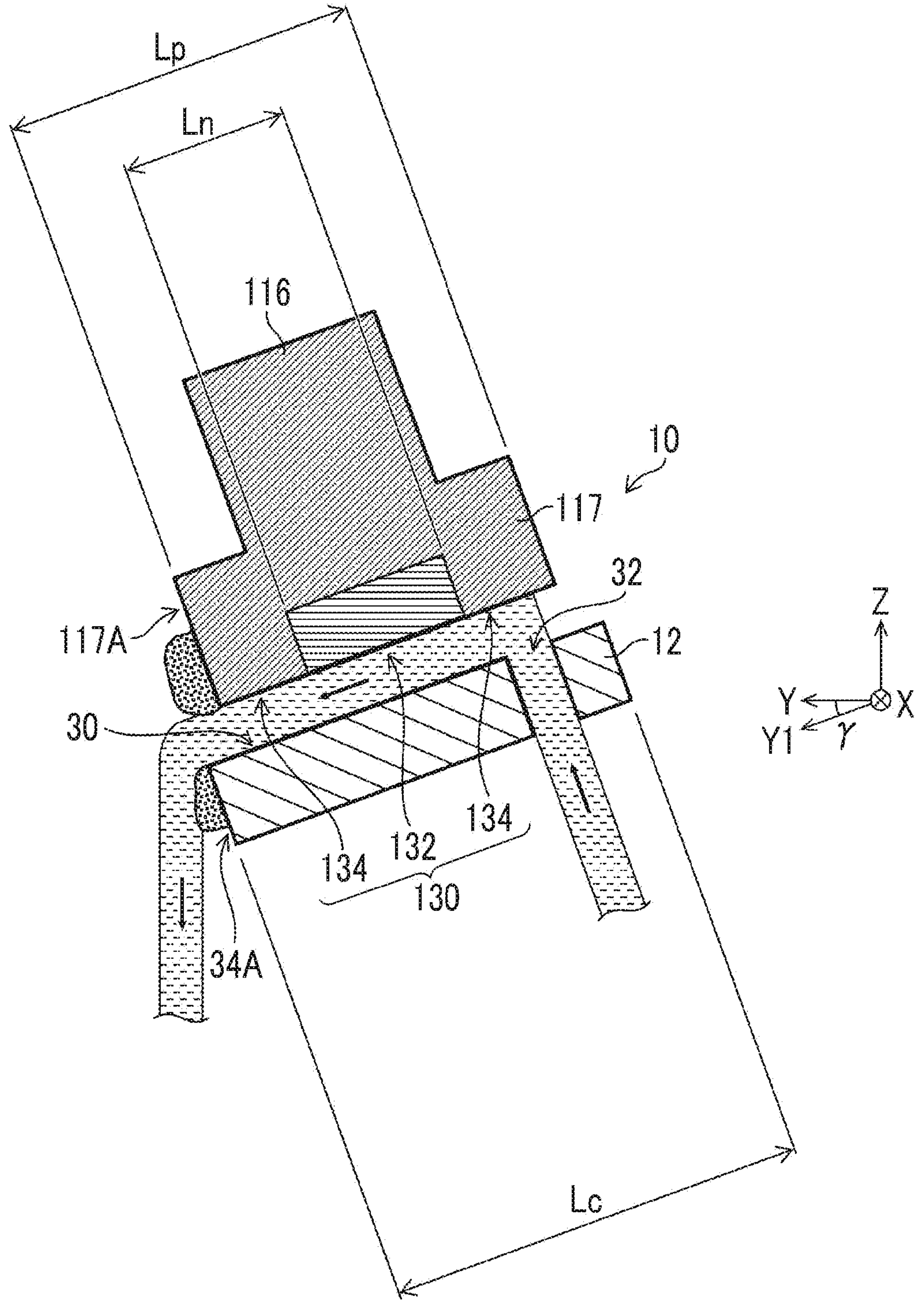
FIG. 6 is a side view of the print head washing device.

FIG. 6 is a schematic view showing a cross section of the print head washing device 10 and is a schematic view showing a state where the nozzle surface 130 of the ink jet head 117 is washed. As shown in FIG. 6, the nozzle surface 130 and the washing solution holding surface 30 are disposed to face each other in parallel. In addition, the entire nozzle plate 132 and the entire nozzle surface 130 in the Y1-direction are disposed at positions facing the washing solution holding surface 30. Further, the washing solution supply port 32 is disposed at a position facing the wing portion 134.

In this case, a washing solution is supplied from the washing solution supply port 32 to the washing solution holding surface 30 by an amount, which is equal to or more than an amount filling a space between the nozzle surface 130 and the washing solution holding surface 30. The washing solution supplied from the washing solution supply port 32 to the washing solution holding surface 30 fills the space between the nozzle surface 130 and the washing solution holding surface 30, washes the nozzle surface 130 by flowing through the washing solution holding surface 30 according to gravity, and removes an ink adhering to the nozzle surface 130.

After then, the washing solution mixed with the ink removed from the nozzle surface 130 falls down from an end part of the washing solution holding surface 30 on a vertically downward side (herein, an end part on a +Y1-direction side) and is collected in the collection dish 20 (see FIG. 3).

The print head washing device 10 shown in FIG. 6 satisfies a relationship of the following expression 1 in a case where the length of the nozzle surface 130 in the Y1-direction (an example of a "first direction") is defined as Lp, the length of the nozzle plate 132 in the Y1-direction is defined as Ln, and the length of the washing solution holding surface 30 in the Y1-direction is defined as Lc.

$$Ln < Lp < Lc \quad \text{(Expression 1)}$$

The print head washing device 10 configured as described above has a problem that a mixture of an ink and a washing solution adheres and remains on a side surface of the ink jet head 117 on the vertically downward side (a side surface 117A on the +Y1-direction side in FIG. 6). In addition, there is a problem that the mixture of the ink and the washing solution does not fall down and remains on a side surface of the washing solution applying head 12 on the vertically downward side (a side surface 34A on the +Y1-direction side in FIG. 6).

First Embodiment

A print head washing device according to a first embodiment will be described. Portions common to the print head washing device 10 will be assigned with common reference numerals, and detailed description thereof will be omitted.

Figure 7:
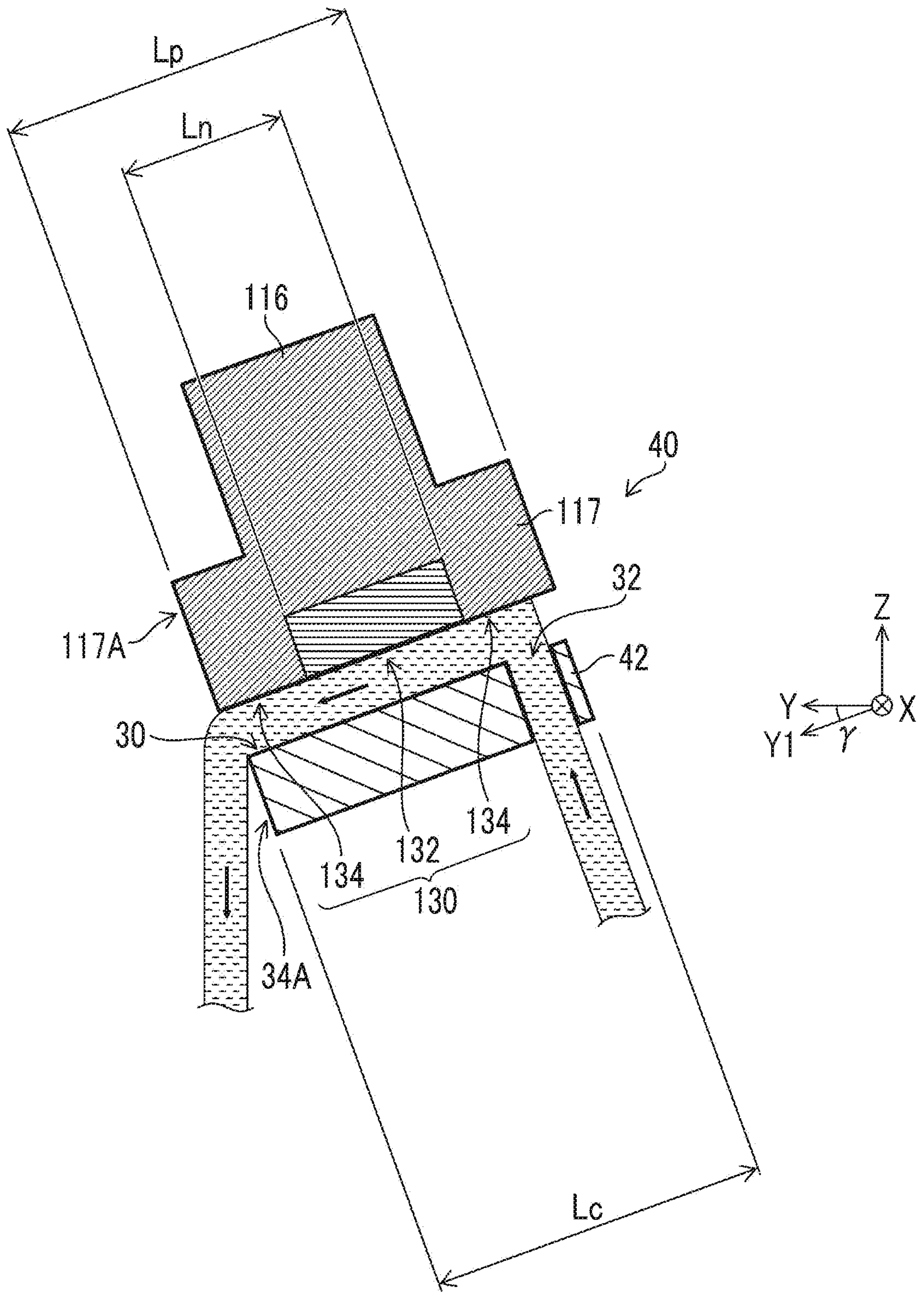
FIG. 7 is a side view of the print head washing device according to a first embodiment.

FIG. 7 is a side view of a print head washing device 40 according to the first embodiment and is a schematic view showing a state where the nozzle surface 130 of the ink jet head 117 is washed.

The print head washing device 40 comprises a washing solution applying head 42. The washing solution applying head 12 and the washing solution applying head 42 differ only in the length of the washing solution holding surface 30 in the Y1-direction, and the other configurations are the same. As shown in FIG. 7, the nozzle surface 130 and the washing solution holding surface 30 are disposed to face each other in parallel. In addition, the entire washing solution holding surface 30 in the Y1-direction is disposed at a position facing the nozzle surface 130, and the entire nozzle plate 132 in the Y1-direction is disposed at a position facing the washing solution holding surface 30.

The print head washing device 40 satisfies a relationship of the following expression 2 in a case where the length of the nozzle surface 130 in the Y1-direction is defined as Lp, the length of the nozzle plate 132 in the Y1-direction is defined as Ln, and the length of the washing solution holding surface 30 in the Y1-direction is defined as Lc.

$$Ln < Lc < Lp \quad \text{(Expression 2)}$$

In this case, a washing solution is supplied from the washing solution supply port 32 to the washing solution holding surface 30 by an amount, which is equal to or more than the amount filling the space between the nozzle surface 130 and the washing solution holding surface 30. The washing solution supplied from the washing solution supply port 32 to the washing solution holding surface 30 fills the space between the nozzle surface 130 and the washing solution holding surface 30, washes the nozzle surface 130 by flowing through the washing solution holding surface 30 according to gravity, and removes an ink adhering to the nozzle surface 130. After then, the washing solution mixed with the ink removed from the nozzle surface 130 falls down from the end part of the washing solution holding surface 30 on the vertically downward side and is collected in the collection dish 20 (see FIG. 3).

The print head washing device 40 can prevent a mixture from being adhered to the side surface 117A by setting the length of the washing solution holding surface 30 of the washing solution applying head 42 in the Y1-direction to a length that does not reach the side surface 117A of the ink jet head 117.

Second Embodiment

A print head washing device according to a second embodiment will be described. Portions common to the print head washing device 40 will be assigned with common reference numerals, and detailed description thereof will be omitted.

Figure 8:
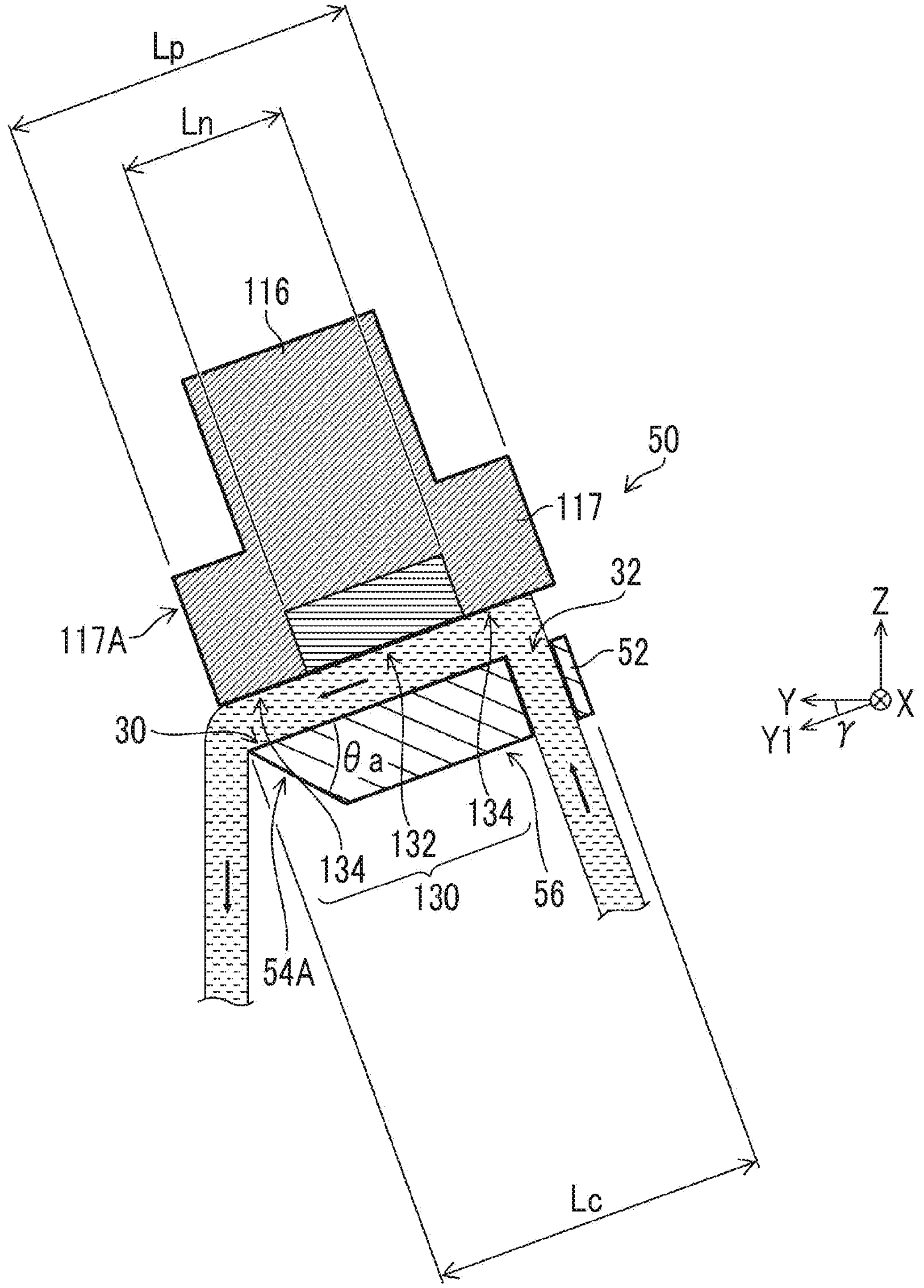
FIG. 8 is a side view of a print head washing device according to a second embodiment.

FIG. 8 is a side view of a print head washing device 50 according to the second embodiment and is a schematic view showing a state where the nozzle surface 130 of the ink jet head 117 is washed.

The print head washing device 50 comprises a washing solution applying head 52. The washing solution applying head 52 comprises the washing solution holding surface 30 and the washing solution supply port 32, like the washing solution applying head 42. As shown in FIG. 8, the nozzle surface 130 and the washing solution holding surface 30 are disposed to face each other in parallel. In addition, the entire washing solution holding surface 30 in the Y1-direction is disposed at a position facing the nozzle surface 130, and the entire nozzle plate 132 in the Y1-direction is disposed at a position facing the washing solution holding surface 30.

The print head washing device 50 satisfies the relationship of expression 2 in a case where the length of the nozzle surface 130 in the Y1-direction is defined as Lp, the length of the nozzle plate 132 in the Y1-direction is defined as Ln, and the length of the washing solution holding surface 30 in the Y1-direction is defined as Lc.

In addition, the washing solution applying head 52 comprises a side surface 54A continuous to the washing solution holding surface 30, which is the side surface 54A on the vertically downward side (the +Y1-direction side in FIG. 8), and a back surface 56 on an opposite side to the washing solution holding surface 30. The washing solution applying head 52 has an end part formed in a tapered shape, and the length of the back surface 56 in the Y1-direction is shorter than the length of the washing solution holding surface 30 in the Y1-direction. That is, an angle θa formed by the washing solution holding surface 30 and the side surface 54A is an acute angle. The angle θa also depends on the angle γ, but is preferably 60 degrees or less and more preferably 45 degrees or less. In addition, the angle θa is preferably 20 degrees or more and more preferably 30 degrees or more.

In this case, a washing solution is supplied from the washing solution supply port 32 to the washing solution holding surface 30 by an amount, which is equal to or more than the amount filling the space between the nozzle surface 130 and the washing solution holding surface 30. The washing solution supplied from the washing solution supply port 32 to the washing solution holding surface 30 fills the space between the nozzle surface 130 and the washing solution holding surface 30, washes the nozzle surface 130 by flowing through the washing solution holding surface 30 according to gravity, and removes an ink adhering to the nozzle surface 130. After then, the washing solution mixed with the ink removed from the nozzle surface 130 falls down from the end part of the washing solution holding surface 30 on the vertically downward side and is collected in the collection dish 20 (see FIG. 3).

Since the end part of the washing solution applying head 52 is formed in a tapered shape, a mixture of a washing solution and an ink easily flows to a downward side of the side surface 54A in a vertical direction, the print head washing device 50 can prevent the mixture from being adhered to the side surface 54A.

Third Embodiment

A print head washing device according to a third embodiment will be described. Portions common to the print head washing device 50 will be assigned with common reference numerals, and detailed description thereof will be omitted.

Figure 9:
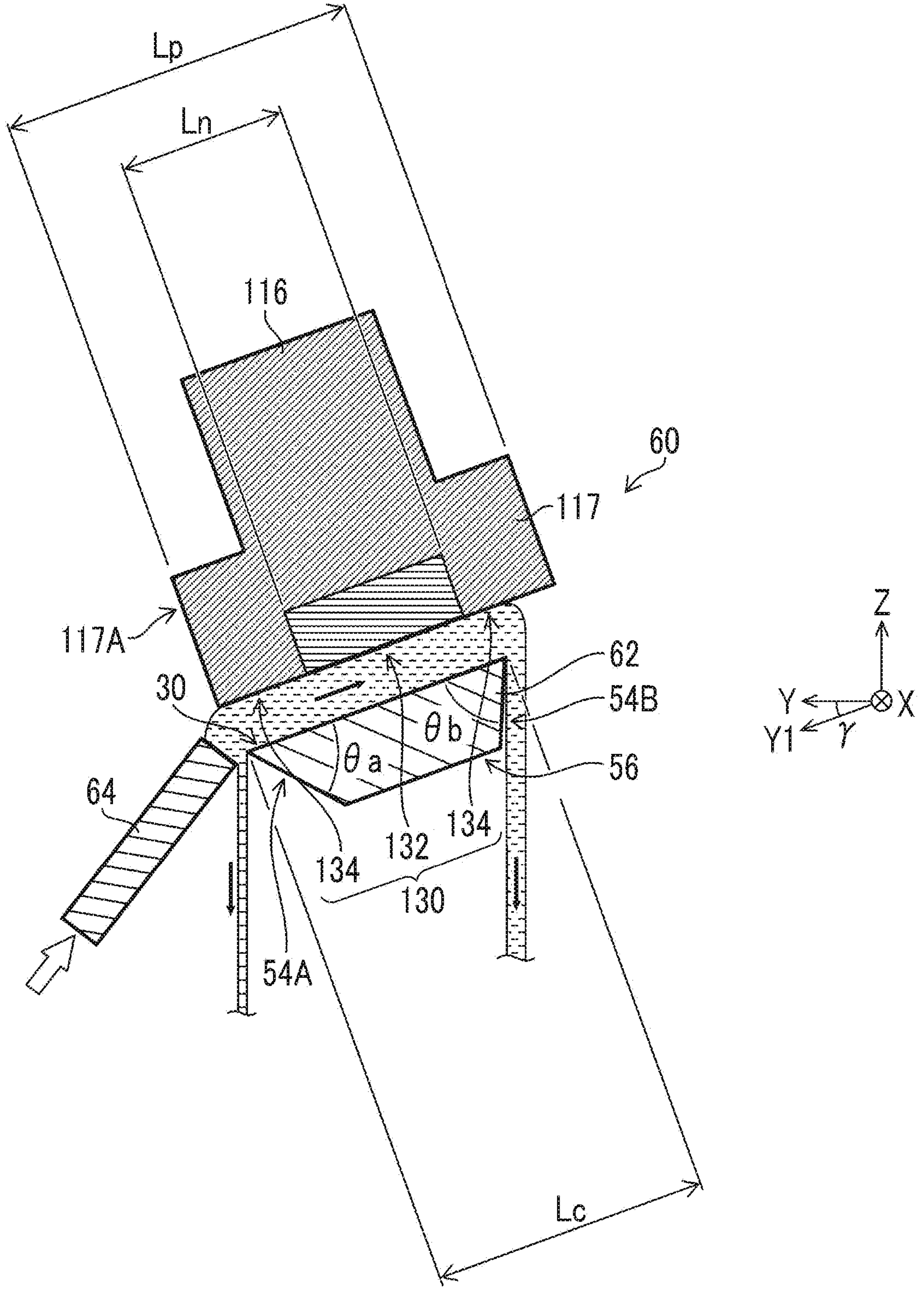
FIG. 9 is a side view of a print head washing device according to a third embodiment.

FIG. 9 is a side view of a print head washing device 60 according to the third embodiment and is a schematic view showing a state where the nozzle surface 130 of the ink jet head 117 is washed.

The print head washing device 60 comprises a washing solution applying head 62. The washing solution applying head 62 comprises the washing solution holding surface 30, like the washing solution applying head 52. The washing solution applying head 62 does not comprise the washing solution supply port 32. As shown in FIG. 9, the nozzle surface 130 and the washing solution holding surface 30 are disposed to face each other in parallel. In addition, the entire washing solution holding surface 30 in the Y1-direction is disposed at a position facing the nozzle surface 130, and the entire nozzle plate 132 in the Y1-direction is disposed at a position facing the washing solution holding surface 30.

The print head washing device 60 satisfies the relationship of expression 2 in a case where the length of the nozzle surface 130 in the Y1-direction is defined as Lp, the length of the nozzle plate 132 in the Y1-direction is defined as Ln, and the length of the washing solution holding surface 30 in the Y1-direction is defined as Lc.

In addition, the washing solution applying head 62 has an end part formed in a tapered shape, and the length of the back surface 56 in the Y1-direction is shorter than the length of the washing solution holding surface 30 in the Y1-direction.

Further, the washing solution applying head 62 comprises a side surface 54B on a vertically upward side (a −Y1-direction side in FIG. 9), and an angle θb formed by the washing solution holding surface 30 and the side surface 54B is an acute angle. The angle θb also depends on the angle γ, but is preferably 60 degrees or less and more preferably 45 degrees or less. In addition, the angle θb is preferably 20 degrees or more and more preferably 30 degrees or more.

In addition, the print head washing device 60 comprises a washing solution supply nozzle 64. The washing solution supply nozzle 64 is disposed on the vertically downward side (a +Y-direction side in FIG. 9) of the washing solution holding surface 30 and at a position facing the wing portion 134 in a state of facing the ink jet head 117. The washing solution supply nozzle 64 may be provided as a hole open in the washing solution holding surface 30, like the washing solution supply port 32.

The washing solution supply nozzle 64 spurts a washing solution supplied from the washing solution tank 14 by the supply pump 18 so that the washing solution is supplied to the washing solution holding surface 30. The washing solution is supplied from the washing solution supply nozzle 64 by an amount, which is equal to or larger than the amount filling the space between the nozzle surface 130 and the washing solution holding surface 30.

A washing solution supplied from the washing solution supply nozzle 64 to the washing solution holding surface 30 fills the space between the nozzle surface 130 and the washing solution holding surface 30, washes the nozzle surface 130 by flowing through the washing solution holding surface 30 from the downward side toward an upward side in the vertical direction against gravity, and removes an ink adhering to the nozzle surface 130. The flow speed of the washing solution herein is slower than the flow speed of the washing solution flowing through the washing solution holding surface 30 according to gravity in the first embodiment.

After then, a washing solution mixed with an ink removed from the nozzle surface 130 through washing falls down from an end part of the washing solution holding surface 30 on the vertically upward side (herein, an end part on the −Y-direction side) and is collected in the collection dish 20. In addition, some of the washing solution supplied from the washing solution supply nozzle 64 to the washing solution holding surface 30 falls down from the end part of the washing solution holding surface 30 on the vertically downward side as it is and is collected in the collection dish 20.

The print head washing device 60 reduces the amount of a washing solution falling down from between the nozzle surface 130 and the washing solution holding surface 30 by covering the flow rate of the washing solution falling down from between the nozzle surface 130 and the washing solution holding surface 30 according to gravity with a force (flow rate) of the washing solution flowing against gravity. Therefore, the amount of the washing solution used in a case of washing only for the same time can be relatively reduced compared to the print head washing device 40 and the print head washing device 50.

In addition, since the end part of the washing solution applying head 62 is formed in a tapered shape, a mixture of a washing solution and an ink easily flows to the downward side of the side surface 54A and the side surface 54B in the vertical direction, and the print head washing device 60 can prevent the mixture from being adhered to the side surface 54A and the side surface 54B.

<Configuration of Ink Jet Recording Device>

An ink jet recording device (an example of the "printing device") to which the print head washing device is applied will be described.

Figure 10:
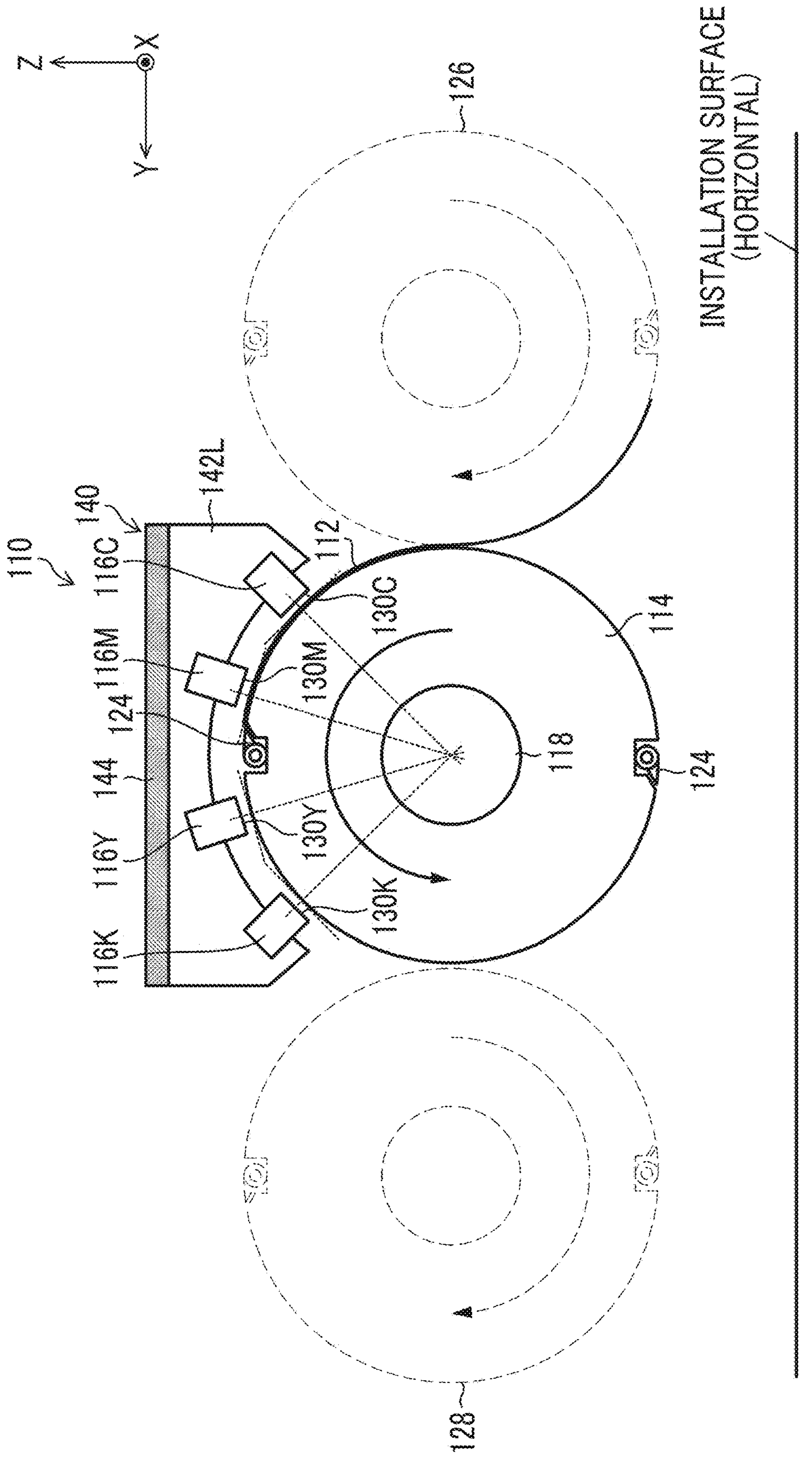
FIG. 10 is a side view showing a schematic configuration of an image recording unit of an ink jet recording device.

FIG. 10 is a side view showing a schematic configuration of an image recording unit of the ink jet recording device that records an image on single-sheet paper in a single-pass manner. As shown in FIG. 10, an image recording unit 110 drum-transports single-sheet paper 112 with an image recording drum 114. In addition, as print bars 116C, 116M, 116Y, and 116K provided in the vicinity of the image recording drum 114 respectively jet ink droplets of respective colors, including cyan (C), magenta (M), yellow (Y), and black (K), the image recording unit 110 records a color image on the surface of the single-sheet paper 112 in the process of being transported by the image recording drum 114.

The image recording drum 114 has a rotary shaft 118. Both end parts of the rotary shaft 118 are rotatably provided by being pivotally supported by a pair of bearings 122 (see FIG. 11). The pair of bearings 122 is provided at a body frame 120 (see FIG. 11) of the ink jet recording device. The image recording drum 114 is horizontally attached as both end parts of the rotary shaft 118 are pivotally supported by the pair of bearings 122 in parallel with a horizontal installation surface.

A motor (not shown) is connected to the rotary shaft 118 via a rotation transmission mechanism (not shown). The image recording drum 114 is driven and rotated by the motor.

The image recording drum 114 has grippers 124 that grip a leading end portion of the single-sheet paper 112. The grippers 124 are provided at two places on an outer circumferential surface of the image recording drum 114, respectively. The leading end portion of the single-sheet paper 112 is gripped by the grippers 124 and is held on the outer circumferential surface of the image recording drum 114.

The image recording drum 114 has a suction holding mechanism (not shown) such as using electrostatic suction and vacuum suction. The suction holding mechanism sucks the back surface of the single-sheet paper 112, of which the leading end portion is gripped by the grippers 124 and which is wound around on the outer circumferential surface of the image recording drum 114, holding the single-sheet paper on the outer circumferential surface of the image recording drum 114.

The single-sheet paper 112 before image recording is delivered from a transport drum 126 to the image recording drum 114. The transport drum 126 is disposed to be juxtaposed with the image recording drum 114 and delivers the single-sheet paper 112 to the image recording drum 114 in accordance with a timing.

In addition, the single-sheet paper 112 after image recording is delivered from the image recording drum 114 to a transport drum 128. The transport drum 128 is disposed to be juxtaposed with the image recording drum 114 and receives the single-sheet paper 112 from the image recording drum 114 in accordance with a timing.

The four print bars 116C, 116M, 116Y, and 116K are line heads corresponding to the length of the single-sheet paper 112 in the X-direction. The print bar 116 shown in FIG. 1 is applied to each of the print bars 116C, 116M, 116Y, and 116K. That is, each of the print bars 116C, 116M, 116Y, and 116K comprises a plurality of ink jet heads 117.

The print bars 116C, 116M, 116Y, and 116K are attached to a print bar support frame 140 and are disposed radially at regular intervals on a concentric circle about the rotary shaft 118 of the image recording drum 114 and to be bilaterally symmetrical to each other with the image recording drum 114 interposed therebetween. That is, the cyan print bar 116C and the black print bar 116K are disposed to be bilaterally symmetrical to each other with respect to a vertical line segment passing through the center of the image recording drum 114, and the magenta print bar 116M and the yellow print bar 116Y are disposed to be bilaterally symmetrical to each other.

The print bars 116C, 116M, 116Y, and 116K have nozzle surfaces 130C, 130M, 130Y, and 130K of the ink jet heads 117, each of which has the nozzles 138 (see FIG. 2) disposed at a bottom portion. The print bars 116C, 116M, 116Y, and 116K are respectively disposed to be orthogonal to the Y-direction, which is a transport direction of the single-sheet paper 112, and are disposed such that the nozzle surfaces 130C, 130M, 130Y, and 130K of the ink jet heads 117, respectively, face the outer circumferential surface of the image recording drum 114. The print bars 116C, 116M, 116Y, and 116K are disposed such that an interval between the outer circumferential surface of the image recording drum 114 and each of the nozzle surfaces 130C, 130M, 130Y, and 130K of the ink jet heads 117 is the same distance.

The print bars 116C, 116M, 116Y, and 116K jet ink droplets perpendicularly toward the outer circumferential surface of the image recording drum 114 from the nozzles 138 disposed on the nozzle surfaces 130C, 130M, 130Y, and 130K of the ink jet heads 117, respectively.

Figure 11:
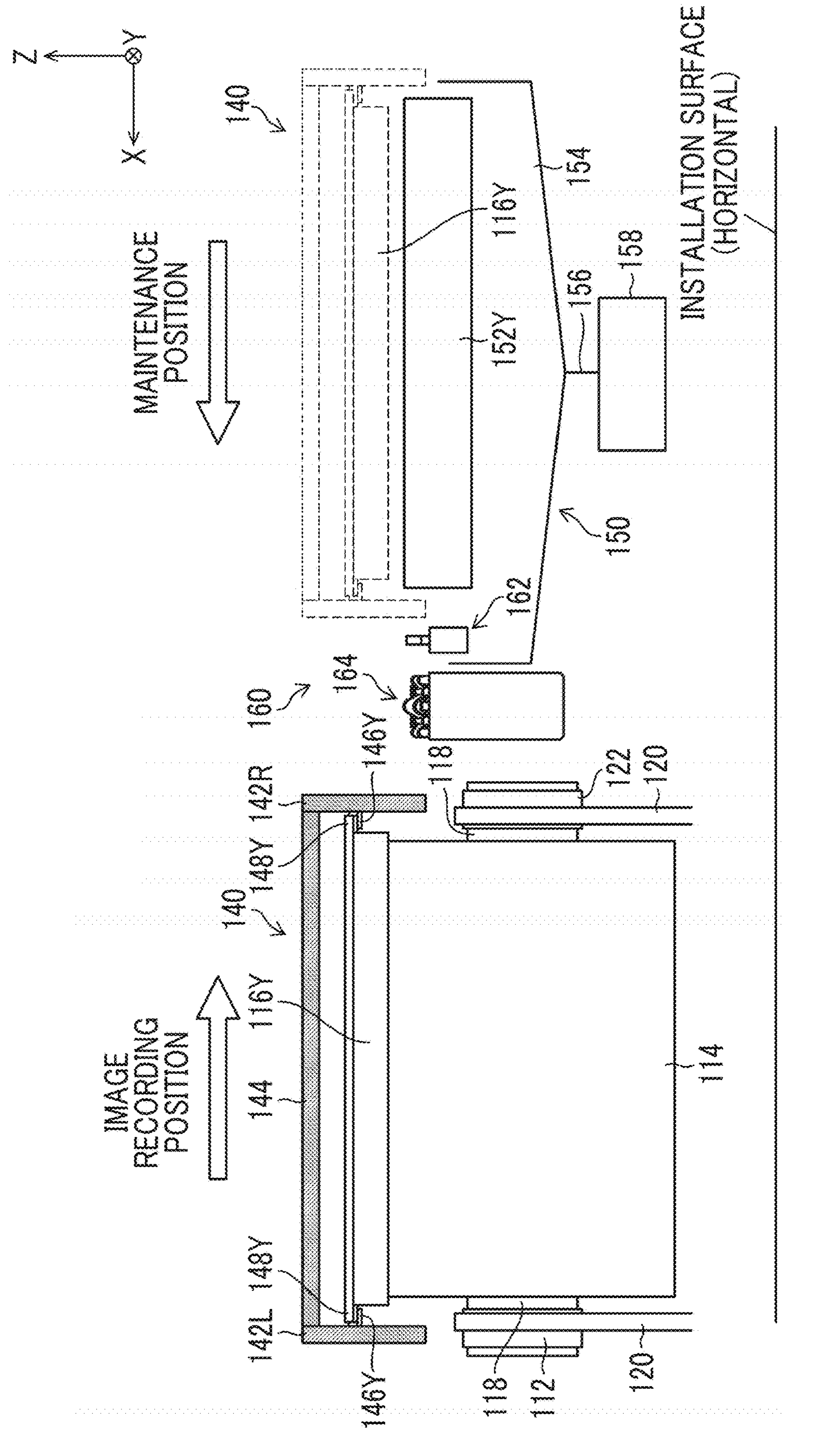
FIG. 11 is a front view showing a schematic configuration of the image recording unit of the ink jet recording device.

FIG. 11 is a front view showing a schematic configuration of the image recording unit of the ink jet recording device. The print bar support frame 140, to which the print bars 116C, 116M, 116Y, and 116K are attached, is composed of a pair of side plates 142L and 142R provided to be orthogonal to the rotary shaft 118 of the image recording drum 114 and a connecting frame 144 that connects upper end parts of the pair of side plates 142L and 142R to each other.

The pair of side plates 142L and 142R has a plate shape and is disposed to face each other with the image recording drum 114 interposed therebetween. On an inner side of the pair of side plates 142L and 142R, attaching portions 146C, 146M, 146Y, and 146K for attaching the print bars 116C, 116M, 116Y, and 116K are provided. For convenience, FIG. 11 shows only the attaching portion 146Y.

The attaching portions 146C, 146M, 146Y, and 146K are disposed radially at regular intervals on the concentric circle about the rotary shaft 118 of the image recording drum 114. As attached portions 148C, 148M, 148Y, and 148K (FIG. 11 shows only the attached portion 148Y for convenience) provided at both ends are fixed to the attaching portions 146C, 146M, 146Y, and 146K, the print bars 116C, 116M, 116Y, and 116K are attached to the print bar support frame 140.

The print bar support frame 140 is guided by a guide rail (not shown) and is provided to be slidably movable in parallel with the rotary shaft 118 of the image recording drum 114. The print bar support frame 140 is driven by a linear drive mechanism (not shown) (for example, a feed screw mechanism and the like) and moves at a predetermined movement speed between an "image recording position" shown by a solid line in FIG. 11 and a "maintenance position" shown by a broken line in FIG. 11.

In a case where the print bar support frame 140 is positioned at the image recording position, the print bars 116C, 116M, 116Y, and 116K are disposed in the vicinity of the image recording drum 114 and are brought into an image recordable state.

The maintenance position is set to a position where the print bars 116C, 116M, 116Y, and 116K are retracted from the image recording drum 114. At the maintenance position, a moisturizing unit 150 for moisturizing the nozzle surfaces 130C, 130M, 130Y, and 130K of the ink jet heads 117 of the print bars 116C, 116M, 116Y, and 116K, respectively, is provided.

The moisturizing unit 150 comprises caps 152C, 152M, 152Y, and 152K (FIG. 11 shows only the cap 152Y for convenience) that cover the nozzle surfaces 130C, 130M, 130Y, and 130K of the ink jet heads 117 of the print bars 116C, 116M, 116Y, and 116K, respectively. In a case where the device is stopped for a long period of time, the nozzle surfaces 130C, 130M, 130Y, and 130K are covered with the caps 152C, 152M, 152Y, and 152K. Accordingly, non-jetting caused by the dry nozzles 138 can be prevented.

The caps 152C, 152M, 152Y, and 152K comprise a pressurizing mechanism (not shown) and a suction mechanism (not shown) and can pressurize and suck the nozzles 138. In addition, the caps 152C, 152M, 152Y, and 152K comprise a washing solution supply mechanism (not shown) and can supply a washing solution to the inside.

A waste liquid tray 154 is disposed at a position below the caps 152C, 152M, 152Y, and 152K. A washing solution supplied to the caps 152C, 152M, 152Y, and 152K is discarded to the waste liquid tray 154 and is collected in a waste liquid tank 158 via a waste liquid collecting pipe 156.

Between the image recording position and the maintenance position, a nozzle surface cleaning device 160 for cleaning the nozzle surfaces 130C, 130M, 130Y, and 130K of the ink jet heads 117 of the print bars 116C, 116M, 116Y, and 116K, respectively, is provided. The nozzle surface cleaning device 160 is composed of a washing solution applying portion 162 that washes the nozzle surfaces 130C, 130M, 130Y, and 130K of the ink jet heads 117 of the print bars 116C, 116M, 116Y, and 116K, respectively, by applying a washing solution thereto and a wiping unit 164 that wipes the nozzle surfaces 130C, 130M, 130Y, and 130K to which the washing solution is applied.

The washing solution applying portion 162 applies a washing solution to the nozzle surfaces 130C, 130M, 130Y, and 130K of the ink jet heads 117 of the print bars 116C, 116M, 116Y, and 116K, respectively. The wiping unit 164 (an example of a "wiping device") wipes the nozzle surfaces 130C, 130M, 130Y, and 130K to which the washing solution is applied with a strip-shaped wiping web (not shown) (an example of a "wiping member").

By moving the print bars 116C, 116M, 116Y, and 116K between the maintenance position and the image recording position, the nozzle surfaces 130C, 130M, 130Y, and 130K of the ink jet heads 117, respectively, are cleaned by the nozzle surface cleaning device 160.

The wiping unit 164 is disposed on an image recording position side with respect to the washing solution applying portion 162 in the example shown in FIG. 11, but may be disposed on a maintenance position side with respect to the washing solution applying portion 162.

<Configuration of Washing Solution Applying Portion>

Figure 12:
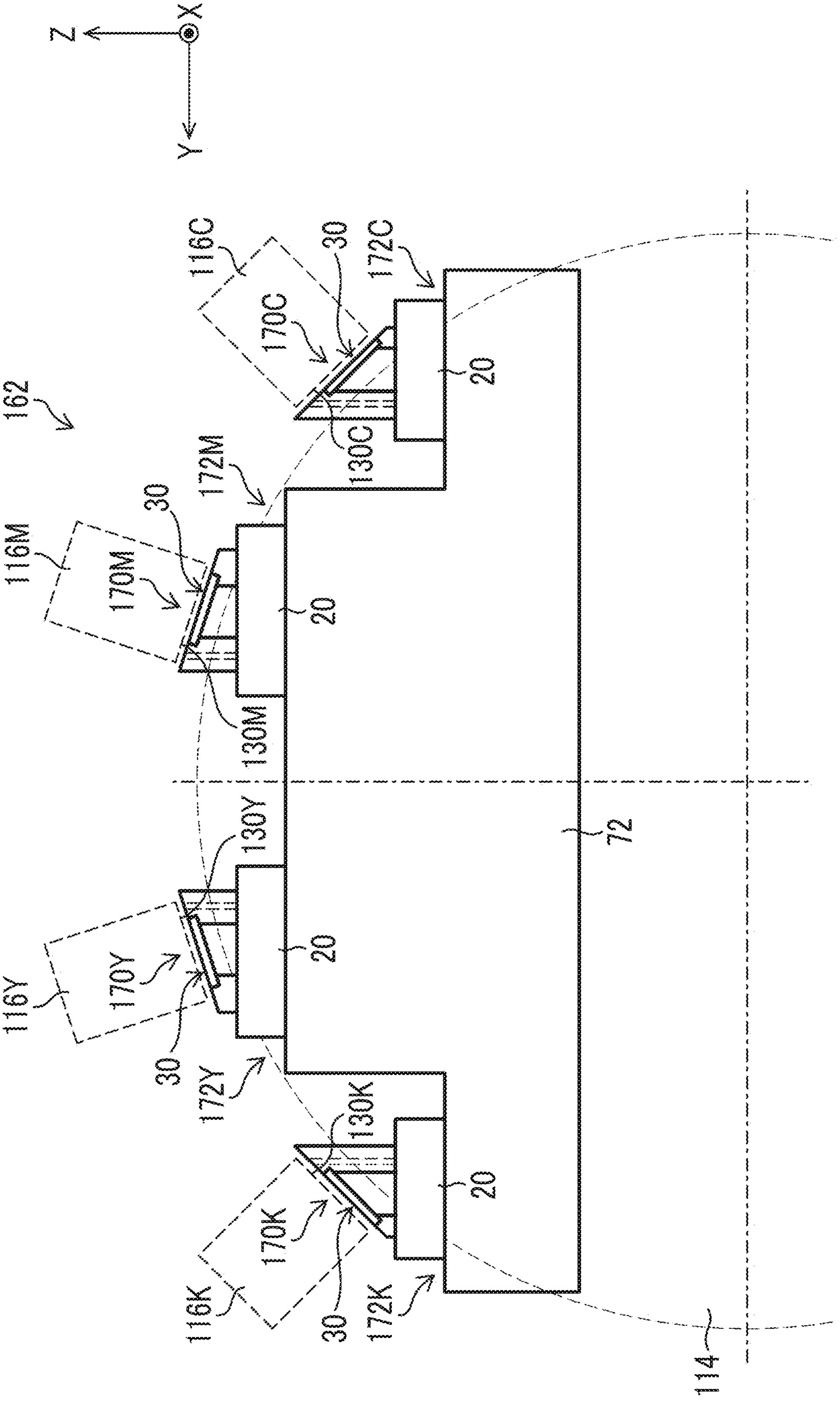
FIG. 12 is a side view of a washing solution applying portion, which is viewed from a maintenance position side.

FIG. 12 is a side view of the washing solution applying portion 162, which is viewed from the maintenance position side. The washing solution applying portion 162 is installed on the inner side of the waste liquid tray 154 comprised in the moisturizing unit 150 (see FIG. 11). The washing solution applying portion 162 comprises washing solution applying units 170C, 170M, 170Y, and 170K which are provided to correspond to the print bars 116C, 116M, 116Y, and 116K, respectively, and a body 172 on which the washing solution applying units 170C, 170M, 170Y, and 170K are mounted.

The body 172 is installed horizontally and is freely lifted and lowered by a lifting and lowering device (not shown). The body 172 has washing solution applying unit attaching portions 172C, 172M, 172Y, and 172K on an upper surface portion. The washing solution applying units 170C, 170M, 170Y, and 170K are fixed to the washing solution applying unit attaching portions 172C, 172M, 172Y, and 172K provided on the body 172 by a bolt and the like and are disposed on movement paths of the print bars 116C, 116M, 116Y, and 116K corresponding thereto.

Each of the print head washing device 40, the print head washing device 50, or the print head washing device 60 is applied to the washing solution applying units 170C, 170M, 170Y, and 170K. That is, each of the washing solution applying units 170C, 170M, 170Y, and 170K comprises the washing solution holding surface 30 and the washing solution supply port 32.

Each of the washing solution holding surfaces 30 of the washing solution applying units 170C, 170M, 170Y, and 170K has the same inclined angle as those of the nozzle surfaces 130C, 130M, 130Y, and 130K of the ink jet heads 117 of the print bars 116C, 116M, 116Y, and 116K, respectively. The inclined angle corresponds to the angle $\gamma$ described above.

<Electric Configuration of Ink Jet Recording Device>

FIG. 13 is a block diagram showing an electric configuration of the image recording unit 110. The image recording unit 110 comprises a movement control unit 200, the transport control unit 202, an image recording control unit 206, a moisturizing unit control unit 208, a washing solution control unit 210, a wiping control unit 212, and a back pressure control unit 214.

The movement control unit 200 controls movement of the print bars 116C, 116M, 116Y, and 116K (an example of "relative movement"). The movement control unit 200 drives the linear drive mechanism (not shown) to move the print bars 116C, 116M, 116Y, and 116K supported by the print bar support frame 140 between the image recording position and the maintenance position (see FIG. 11).

The transport control unit 202 controls transport of the single-sheet paper 112. The transport control unit 202 controls the grippers 124 (see FIG. 10) and causes the grippers 124 to grip the leading end portion of the single-sheet paper 112. In addition, the transport control unit 202 controls the suction holding mechanism (not shown) and causes the outer circumferential surface of the image recording drum 114 to hold the single-sheet paper 112. Further, the transport control unit 202 drives the motor (not shown) to rotate the image recording drum 114 and causes the single-sheet paper 112 to be held and transported by the image recording drum 114.

In addition, the transport control unit 202 drives the transport drum 126 and the transport drum 128 (see FIG. 10) to transport the single-sheet paper 112 from the transport drum 126 to the image recording drum 114 and further from the image recording drum 114 to the transport drum 128.

The image recording control unit 206 controls the print bars 116C, 116M, 116Y, and 116K. The image recording control unit 206 causes ink droplets to be jetted from the nozzles 138 of the ink jet heads 117 of the print bars 116C, 116M, 116Y, and 116K, respectively, and causes a color image to be recorded on the surface of the single-sheet paper 112 transported by the image recording drum 114.

The moisturizing unit control unit 208 controls the moisturizing unit 150 so that the nozzle surfaces 130C, 130M, 130Y, and 130K of the ink jet heads 117 of the print bars 116C, 116M, 116Y, and 116K, respectively, are moisturized. The moisturizing unit control unit 208 controls the pressurizing mechanism (not shown) and the suction mechanism (not shown) so that pressurizing and suction of the nozzles 138 of the ink jet heads 117 of the print bars 116C, 116M, 116Y, and 116K, respectively, are performed from the caps 152C, 152M, 152Y, and 152K. The moisturizing unit control unit 208 controls the washing solution supply mechanism (not shown) so that a washing solution is supplied into the caps 152C, 152M, 152Y, and 152K.

The washing solution control unit 210 controls the washing solution applying portion 162 so that a washing solution is applied to the nozzle surfaces 130C, 130M, 130Y, and 130K of the ink jet heads 117 of the print bars 116C, 116M, 116Y, and 116K, respectively. The washing solution control unit 210 raises the body 172 (see FIG. 12) by a predetermined amount and moves the body 172 from a standby position to an operating position. In addition, the washing solution control unit 210 drives the supply pump 18 of each of the washing solution applying units 170C, 170M, 170Y, and 170K so that the washing solution is jetted from the washing solution supply port 32 (see FIG. 4).

The wiping control unit 212 controls the wiping unit 164 so that the nozzle surfaces 130C, 130M, 130Y, and 130K of the ink jet heads 117 of the print bars 116C, 116M, 116Y, and 116K, respectively, are wiped with the wiping web.

<Others>

As liquid-repellent processing is performed on a side surface (for example, the side surface 34A) of the washing solution applying head 12 to impart liquid repellency, remaining of a mixture on the side surface may be suppressed. However, it takes more costs than forming the end part in a tapered shape.

The technical scope of the present invention is not limited to the scope described in the embodiments. The configuration and the like in each embodiment can be combined between the embodiments as appropriate without departing from the gist of the present invention.

EXPLANATION OF REFERENCES

10: print head washing device
12: washing solution applying head
14: washing solution tank
16: supply flow passage
18: supply pump
20: collection dish
22: collection flow passage
24: collection tank
30: washing solution holding surface
32: washing solution supply port
34A: side surface
40: print head washing device
42: washing solution applying head
50: print head washing device
52: washing solution applying head
54A: side surface
54B: side surface
56: back surface
60: print head washing device
62: washing solution applying head
64: washing solution supply nozzle
110: image recording unit
112: single-sheet paper
114: image recording drum
116: print bar
116C: print bar
116K: print bar
116M: print bar
116Y: print bar
117: ink jet head
117A: side surface
118: rotary shaft
120: body frame
122: bearing
124: gripper
126: transport drum
128: transport drum
130: nozzle surface
130C: nozzle surface
130K: nozzle surface
130M: nozzle surface
130Y: nozzle surface
132: nozzle plate
134: wing portion
136: end cap portion
138: nozzle
140: print bar support frame
142L: side plate
142R: side plate
144: connecting frame
146C: attaching portion
146K: attaching portion
146M: attaching portion
146Y: attaching portion
148C: attached portion
148K: attached portion
148M: attached portion
148Y: attached portion
150: moisturizing unit
152C: cap
152K: cap
152M: cap

152Y: cap
154: waste liquid tray
156: waste liquid collecting pipe
158: waste liquid tank
160: nozzle surface cleaning device
162: washing solution applying portion
164: wiping unit
170C: washing solution applying unit
170K: washing solution applying unit
170M: washing solution applying unit
170Y: washing solution applying unit
172: body
172C: washing solution applying unit attaching portion
172K: washing solution applying unit attaching portion
172M: washing solution applying unit attaching portion
172Y: washing solution applying unit attaching portion
200: movement control unit
202: transport control unit
206: image recording control unit
208: moisturizing unit control unit
210: washing solution control unit
212: wiping control unit
214: back pressure control unit

What is claimed is:

1. A printing device comprising:

a print head that jets an ink from a plurality of nozzles disposed on a nozzle surface;

a washing solution holding member that has a washing solution holding surface;

a relative moving mechanism that relatively moves the print head and the washing solution holding member and that causes the washing solution holding surface and the nozzle surface to face each other; and a washing solution applying mechanism that applies a washing solution to the washing solution holding surface and that washes the nozzle surface facing the washing solution holding surface, wherein the nozzle surface has a nozzle region where the plurality of nozzles are disposed and that has liquid repellency and a non-nozzle region that has relatively lower liquid repellency than the liquid repellency of the nozzle region, in a case where a length of the nozzle surface in a first direction is defined as Lp, a length of the nozzle region in the first direction is defined as Ln, and a length of the washing solution holding surface in the first direction is defined as Lc, a relationship of $Ln<Lc<Lp$ is satisfied, and the relative moving mechanism causes the washing solution holding surface and the nozzle surface to face each other in a state where the first direction is inclined with respect to a horizontal plane, wherein the washing solution holding member has an exterior side surface, at a lower side of the washing solution holding surface in a direction of gravity, continuous to the washing solution holding surface, and an angle formed by the side surface on a downward side in a vertical direction and the washing solution holding surface is an acute angle.

2. The printing device according to claim 1, wherein the relative moving mechanism causes the entire washing solution holding surface in the first direction to face the nozzle surface and causes the entire nozzle region in the first direction to face the washing solution holding surface.

3. The printing device according to claim 1 wherein the side surface has liquid repellency.

4. The printing device according to claim 1, wherein the washing solution applying mechanism applies the washing solution to the washing solution holding surface from the downward side toward an upward side in the vertical direction.

5. The printing device according to claim 1, wherein the washing solution holding member has a washing solution supply port in the washing solution holding surface, and the washing solution applying mechanism causes the washing solution to be spurted from the washing solution supply port.

6. The printing device according to claim 5, wherein the relative moving mechanism causes the washing solution supply port and the non-nozzle region to face each other.

7. The printing device according to claim 1, wherein the relative moving mechanism relatively moves the print head in a second direction orthogonal to the first direction, the second direction being parallel to the washing solution holding surface, in a state where the washing solution holding surface and the nozzle surface face each other.

8. The printing device according to claim 7, wherein a plurality of the print heads are arranged in the second direction.

9. The printing device according to claim 1, further comprising:

a wiping device that wipes the washed nozzle surface with a wiping member.

* * * * *